United States Patent Office 3,764,463
Patented Oct. 9, 1973

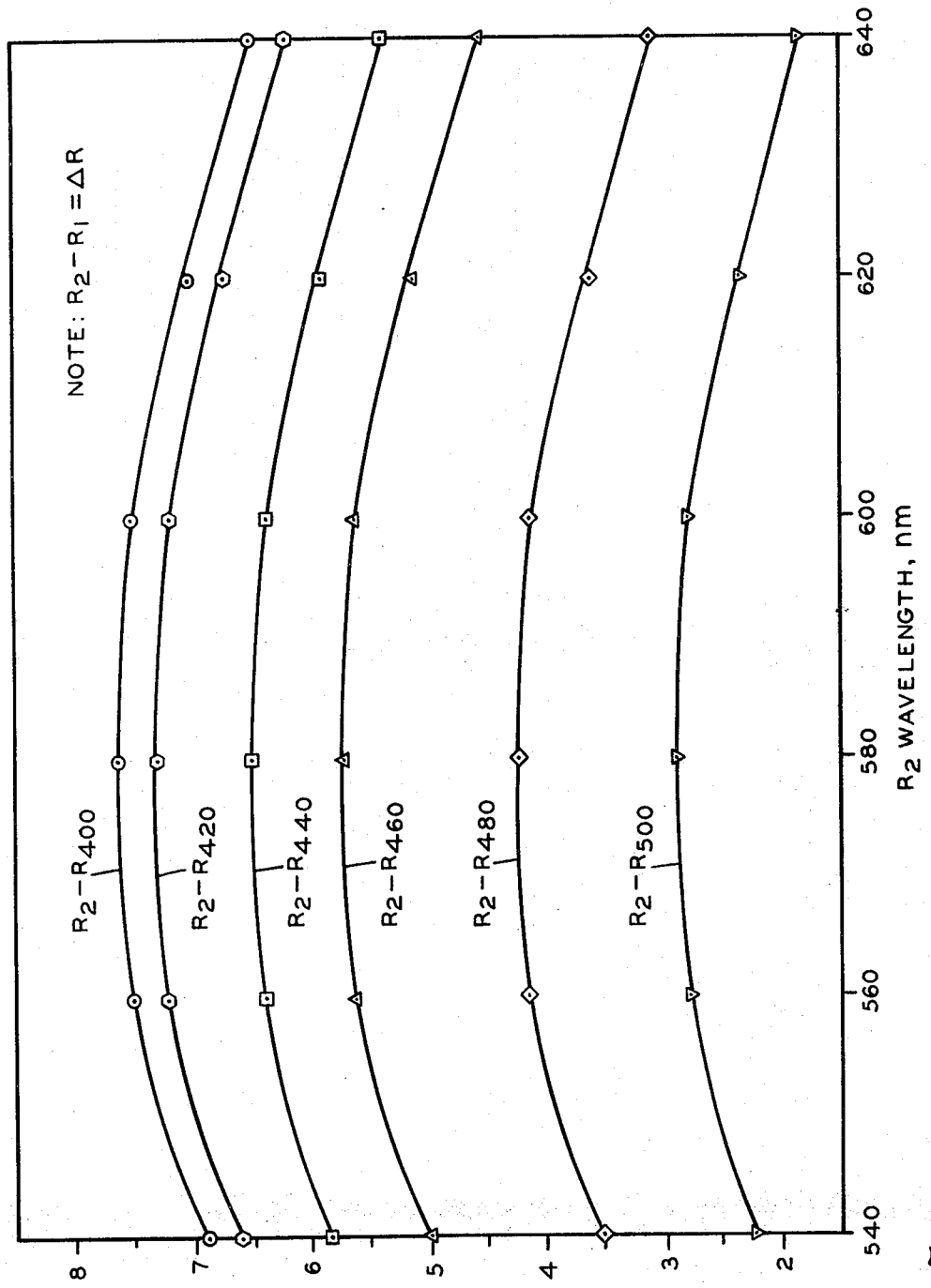
Fig. 5. THE SPREAD IN ΔR UNITS REPRESENTATIVE OF TEN KAPPA NUMBER UNITS OBTAINED USING VARIOUS COMBINATIONS OF WAVELENGTHS FOR $R_2 - R_1$

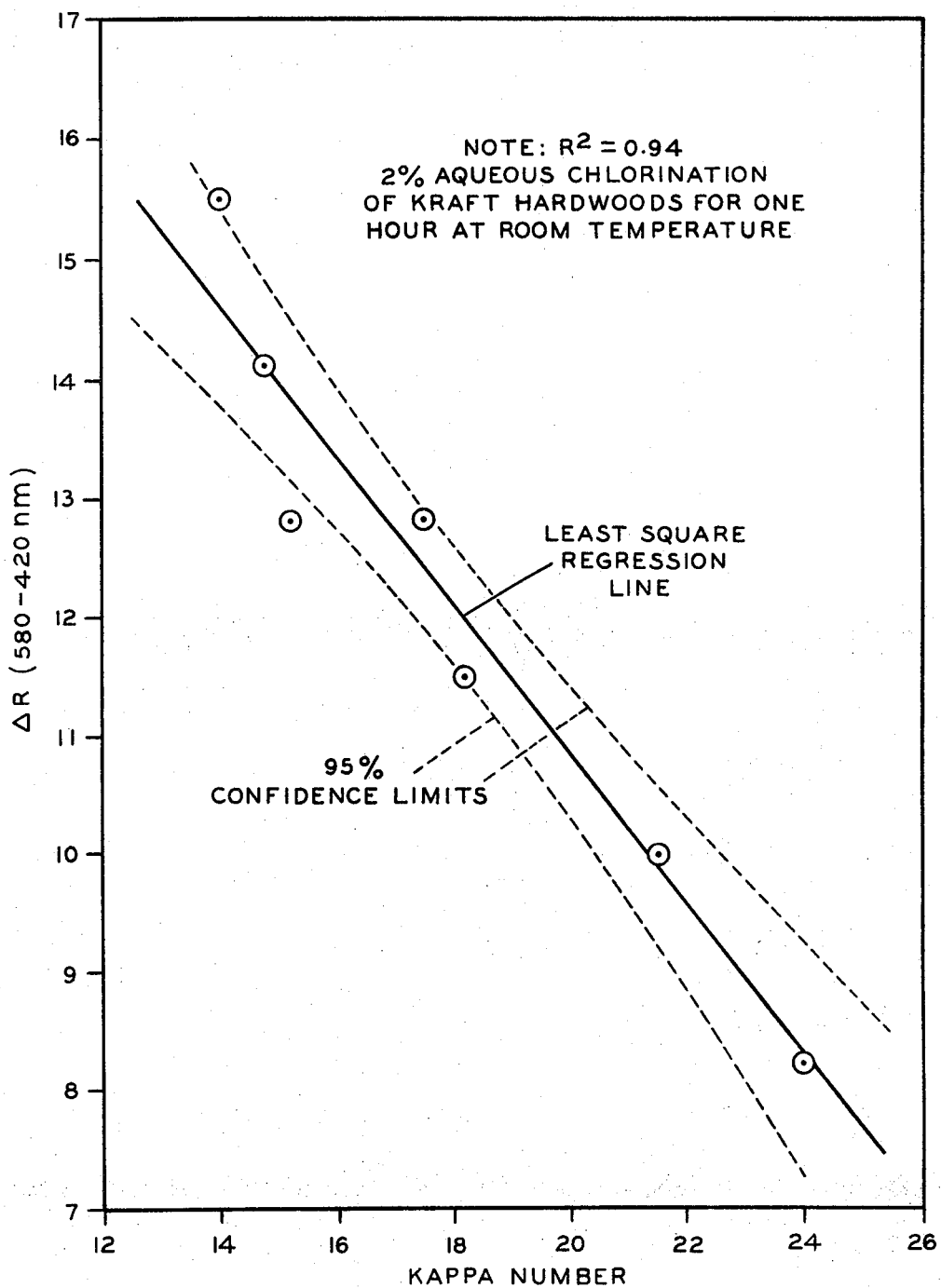

3,764,463
METHOD AND APPARATUS FOR CHROMATIC
CONTROL OF PULPING PROCESS
John A. Histed, L'Orignal, William A. Lawford and
Murray J. McLeod, Hawkesbury, Robert G. Wendeborn, London, Ontario, and Dennis R. Catford, Gold
River, British Columbia, Canada, assignors to Canadian
International Paper Company, Montreal, Quebec, Canada
Filed June 14, 1971, Ser. No. 152,728
Int. Cl. D21c 7/12
U.S. Cl. 162—49
16 Claims

ABSTRACT OF THE DISCLOSURE

A method and apparatus for generating a control signal by carrying out a chlorination reaction on a sample of pulp slurry at an elevated temperature for a relatively short period of time and measuring the difference in reflectance at two predetermined wavebands. In one embodiment the pulp sample is taken from a pulp digester and the control signal is representative of the cooking degree of the pulp, as measured by the Kappa No., Chlorine No. or Permanganate No. The control signal is electronically fed to the input of a device for automatically controlling the operation of the digester to maintain a desired cooking degree. In another embodiment the sample is taken immediately after the addition of chlorine in the chlorination stage and the control signal is electronically used to automatically vary the level of chlorine applied to the chlorination stage.

BACKGROUND OF THE INVENTION

The invention relates to a system for automatically controlling varous stages in a pulp processing operation by means including a multiple-band chromatic sensor for monitoring the reflectances of a sample of pulp slurry taken from the process stream.

It is an established practice in the pulp processing industry to optically monitor samples of pulp slurry in order to control either manually or automatically certain factors in the treatment of the pulp at different stages of the processing operation. Many of the optical measuring devices in prior systems utilize the light reflectance characteristics of a sample of pulp slurry in one form or another. Some devices simply measure the brightness of the pulp slurry at one waveband. In other devices the reflectance is measured through polarizing systems which determine gloss. In still other devices the luminosity of the pulp slurry is optically measured.

In general such systems are of two types: the optical information obtained is used to control changes upstream from the measurement, which is called a "feedback" system, or the information is used to control treatment downstream from the measurement, which is called a "feed forward" system.

A common problem of the feedback type of system is the large time delay generally involved. In such systems, when the optical measurement indicates that a change is required, this change must be made sufficiently far upstream that certain chemical and physical operations may take place before the product treated with the new conditions reaches the sensor. In chlorination and pulp digesting stages this delay can run from one to several hours. This is true whether the system involves a manual operation, where the operator performs individual tests on samples and then varies conditions upstream based on the sample test results or whether such testing and adjustments are done automatically. The main problem is in allowing sufficient time for the change to operate on the pulp before a new optical measurement is made.

In the feed forward type of system a common problem is that in order to make a change to compensate for deficiencies in the process upstream from the measuring device, relatively large amounts of chemical are required. For example, some prior systems of this type optically measure the pulp slurry after it has passed through the chlorination and caustic extraction stages. If the pulp slurry is of the wrong color or of insufficient brightness, more chemicals are added in the bleaching stages. In general the cost of adding chemicals in the bleaching stages to correct for insufficient chlorination is more expensive than if the chlorination itself could be properly controlled.

In addition there are various problems for either type of system in the control of particular operations. In the control of pulp digesting, for example, the pulp remains contained in the digester for a period of several hours. Under most prior systems, the chemical determination of the pulp cooking degree can only be done from a sample of pulp slurry after it leaves the digester. This chemical determination requires approximately one hour. Thereafter various factors in the control of the digester may be changed but there is a delay of several hours in the effect of such changes and the return to optimum pulp quality. Furthermore, most such systems require the determination of the cooking degree of the pulp slurry to be carried out manually rather than automatically.

The present invention overcomes these and other disadvantages by a novel method and apparatus as will become apparent from the following summary and detailed description of certain preferred embodiments of the invention.

SUMMARY OF THE INVENTION

The present invention comprises a method and apparatus for generating a control signal by chlorinating a sample, preferably at elevated temperature and short retention time, and optically measuring the reflectance at two predetermined wavebands on the sample of unwashed slurry. The difference in reflectance, or Delta R ($\Delta R$), between the two wavebands is used to generate an electrical signal which may be used to automatically control certain operations in the pulping process. Since pH affects the reflectance readings, it is generally preferred to measure the reflectances of the slurry on the unwashed stock at the pH of the reaction, which for chlorination with chlorine is generally about 2.0.

In one preferred embodiment a continuous pulp sample is taken from a pulp digester. After preliminary processing a known amount of chlorine is continuously added to the sample and the sample is heated to a predetermined temperature. At the elevated temperature the chlorination reaction is accelerated. For example, at a temperature of 80° C. the reaction may be carried out in only slightly more than one minute, as opposed to about 1 hour at 20° C. Thereafter light from a high intensity source is reflected from the chlorinated pulp sample to two filtered photosensors. One photosensor has a blue filter and the other photosensor has a yellow filter. The electrical outputs of the photosensors are representative of the reflectances of the pulp sample at the respective wavebands. The outputs are fed through a differential amplifier where the output of one photosensor is subtracted from the other to get the difference of the reflectance readings. By knowing the amount of chlorine added to the sample, the time duration and the temperature of the accelerated chlorination reaction, and the difference in reflectance (Delta R) at the two predetermined wavebands, the cooking degree of the pulp as measured by the Permanganate No., the Kappa No. or Chlorine No. may be calculated on the basis of empirical data.

In one particularly advantageous embodiment the Delta R is fed into the input of a computer which is programmed to make the determination of the cooking degree automatically. Other inputs to the computer are the temperature, the pressure, and the cooking liquor concentration within the pulp digester. The computer is programmed to automatically make appropriate changes of one or more of the following factors which control the pulp cooking process in response to variations in the optical sensor output:

(1) Changes in the production rate or the retention time in the cooking zone of the continuous digester by regulating the rate of flow of the wood chips into and the discharge rate from the continuous digester;

(2) Changes in the cooking temperature of the continuous digester by controlling the amount of steam fed to the heat exchangers of the digester; or (3) Changes in the concentration of the cooking liquor applied to the chips within the digester.

In another embodiment of the invention a continuous sample of pulp slurry is taken from the chlorination mixer at the beginning of the chlorination stage. The sample undergoes an accelerated chlorination reaction at an elevated temperature and is then optically measured for reflectance at the two predetermined wavebands. The electronic output from the optical measuring device is fed to a controller which regulates the amount of chlorine added upstream from the sampling point in response to changes in the output from the optical measuring device.

Because an accurate optical indication of the degree of chlorination of the sample may be made according to the invention in as little as one minute, the time delay problem which plagues most prior "feedback" systems is not significant in the present invention.

In both embodiments of the invention rapid and accurate information about the pulp sample is obtained by using an optical sensing device for measuring the difference in reflectance of the pulp slurry sample at two predetermined wavebands after it has undergone an accelerated chlorination reaction at an elevated temperature. Such information in turn allows the control of certain variables either upstream or downstream in the pulping process from the point where the sample is taken with no substantial time delay between the time the sample is taken, the sample is tested an a correction is made.

In still another embodiment of the invention, the means for controlling the digester also controls the chlorination stage. In controlling the digester the cooking degree of the pulp slurry is optically determined as described above. The cooking degree is an indication of how much chlorination will be required after the pulp slurry leaves the digester. Thus, by delaying its response by an appropiate time duration to account for any intermediate storage of the pulp slurry, the controller may inject appropriate amounts of chlorine in the chlorination stage to correct for changes in the cooking degree of the pulp. Thus, the system is automatically operating simultaneously to "feedback" control the digester to maintain a uniform cooking degree and to "feed forward" control the chlorination stage.

It is thus an object of the invention to provide a method and apparatus for rapidly and accurately reacting a sample of pulp slurry with a chlorinating reagent and optically measuring the reflectance at two predetermined wavebands. The information thus obtained is used to automatically control selected pulp processing operations.

It is also an object of the present invention to utilize the difference in reflectance at two predetermined wavebands of a continuous sample of pulp slurry taken from a continuous digester after the pulp sample has undergone an accelerated chlorination reaction at an elevated temperature and to provide means responsive to the optical information thus obtained to control the digesting process and maintain a uniform cooking degree.

It is still another object of the invention to take a sample of pulp slurry between the chlorine mixer and chlorination tower, accelerate the reaction by increasing the temperature, optically measure the difference in reflectance of the sample at two predetermined wavebands and use the optical information thus obtained to control the addition of chlorine in the chlorination stage.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 5 is a graph of experimental results illustrating the spread of the difference in light reflectance of pulp over a range of cooking degrees at various combinations of wavelengths;

FIG. 6 illustrates the correlation between Kappa No. and the difference in reflectance at 580 nm. and 420 nm. for a series of pulp samples.

DESCRIPTION OF CERTAIN PREFERRED EMBODIMENTS

Figure 1:
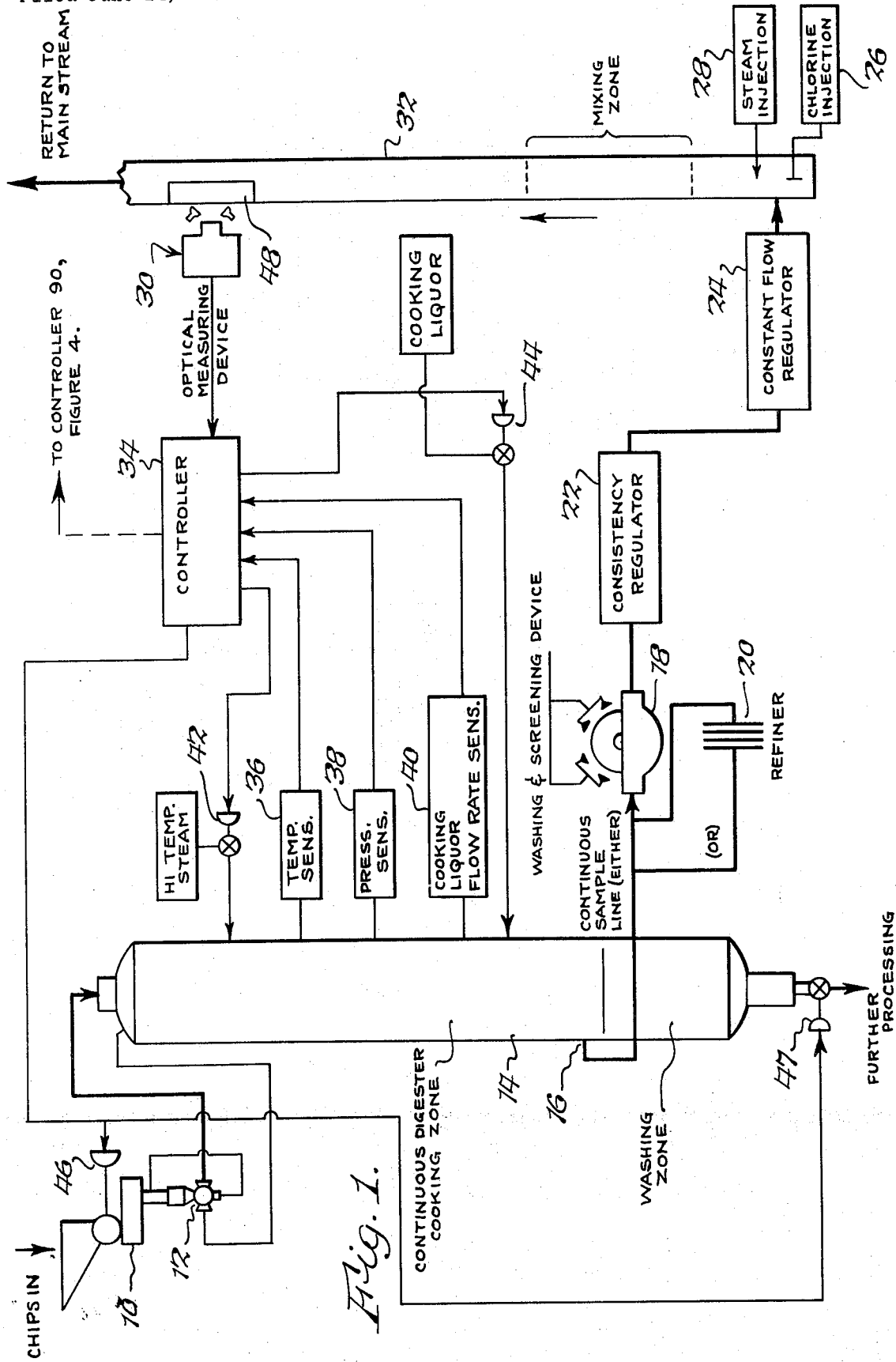
FIG. 1 is a diagrammatic view of one embodiment of the invention as applied to the digesting portion of a pulping process.

Referring now more particularly to FIG. 1 a preferred embodiment of the present invention is shown as comprising apparatus for extracting a continuous sample of pulp slurry from a continuous digester and optically measuring the sample to produce a signal for controlling the operation of the digester. Raw wood chips are loaded into a chip meter 10 where they are mixed with low pressure steam and ultimately fed through a high pressure feeder 12 together with cooking liquor to the inlet of a continuous pulp digester 14.

The pulp is processed within the continuous digester in the usual manner except that the operation of the digester itself is controlled in a manner to be described below.

The continuous digester is normally mounted in a vertical fashion with the chips passing downwardly as they are processed. At the point 16, immediately below the cooking zone, a continuous sample of the pulp slurry is withdrawn and passed through a series of stages. In cases where the pulp slurry is relatively well cooked it is washed to remove the cooking liquor by a washing device 18. In operations where the sample of pulp slurry is quite rough an intermediate refining operation 20 is necessary before the sample is washed.

After leaving the washing device 18 the pulp passes through a consistency regulator 22 which ensures that a predetermined weight of solid pulp material will be contained in a given volume of slurry. The pulp sample passes from the consistency regulator to a constant flow rate regulator 24. Upon leaving the flow regulator 24 clhorine is injected into the sample stream at a constant and predetermined rate by a metered mechanism 26. Since the flow of the sample is also constant the concentration of the chlorine per unit of volume of the sample is known.

Downstream from the chlorine injector 26, steam 28 is injected into the sample stream to heat the mixture to a temperature which may be as high as 80° C., or higher. At 80° C. the chlorination reaction is complete in about one minute. In other embodiments, where time is less crucial, the temperature may be approximately 60° C.

and the reaction is complete in six to ten minutes. The advantage of lower temperatures is that less steam is required and it is slightly more economical.

At a predetermined distance downstream from the steam injection point 28 is an optical measuring device 30 positioned adjacent to the conduit 32 carrying the chlorinated pulp sample. The conduit 32 may be in the form of a closed pipe having a transparent window 48 at the optical measuring station. The rate of flow set by the regulator 24 is adjusted in accordance with the temperature of the heated sample so that by the time a given volume unit of the heated, chlorinated sample has passed over the distance from the steam injector 28 to the optical measuring device 30 the chlorination reaction has reached a predetermined endpoint and is sufficiently complete to allow an optical measurement to be made.

As will be described in greater detail below, the output of the optical measuring device 30 is in the form of an electrical control signal representative of the difference in reflectance at two predetermined wavebands of the chlorinated pulp sample. The output from the optical measuring device 30 is fed to one input of a controller 34.

The controller 34 is shown in FIG. 1 generally in the form of a box. In the present embodiment the controller 34 is representative of a programmed, digital or analog computer. In other embodiments the controller 34 may be a less sophisticated type of electronic, automatic control device. Another input to the controller is from a temperature sensing device 36 which provides an electronic output signal representative of the temperature of the material within the continuous digester. Still another input to the controller 34 is from a pressure sensing device 38 which produces an electronic output signal in response to changes of pressure within the continuous digester. A cooking liquor flow rate sensor 40 which produces an electronic output signal representative of the concentration of the cooking chemical on wood within the digester 14 provides still another input to the controller 34.

The controller also has a plurality of output channels. One output is directed to a servo 42 which controls the input of high temperature steam to the heat exchangers of the digester 14. Another output from the controller is to a servo 44 which controls additions of cooking liquor to the digester 14 and thus is capable of varying the concentration of cooking liquor within the continuous digester. Still other outputs from the controller are to a servo 46 which controls the flow rate of wood chips into the chip feeder 10 and to a servo 47 which controls discharge from the digester. By varying the flow rate of wood chips into and the discharge from the continuous digester, the over-all length of time that the pulp chips are retained within the digester may be controlled.

Figure 2:
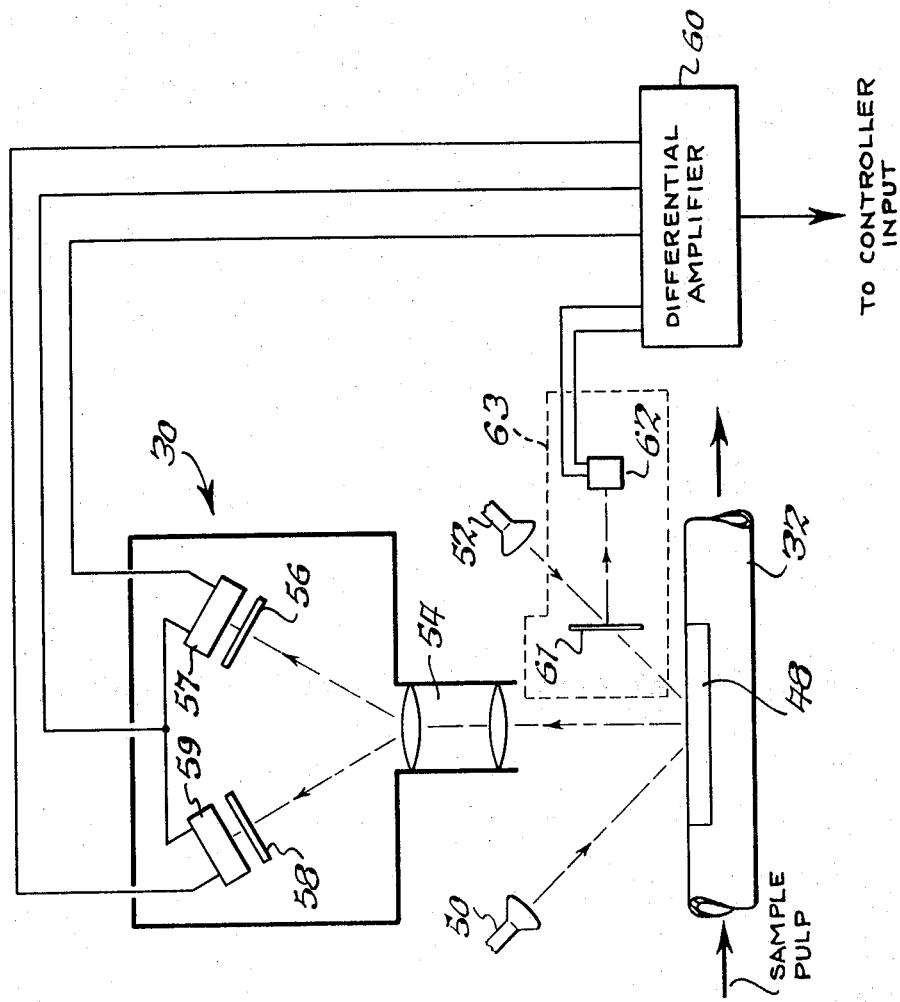
FIG. 2 is a schematic illustration of an optical sensing device for use in the embodiments of FIGS. 1 and 4.

Referring now more particularly to FIG. 2 the optical measuring device 30 is schematically illustrated in greater detail. The sample pulp conduit 32 has a transparent window 48. The optical measuring device designated generally as 30 is positioned adjacent the window 48. Two high intensity lamps 50 and 52 are each positioned at an angle to the plane of the surface of the window 48 such that their combined light is reflected from the pulp surface and measured in a direction normal to the plane of the surface of the window.

The light reflected from the pulp surface passes through a lens system 54 and is split into two beams. One light beam passes through a yellow filter 56 to strike a first optical sensor 57. The other reflected light beam passes through a blue filter 58 to impinge upon a second optical sensor 59. The electrical outputs from the optical sensors 57 and 59 are fed to a differential amplifier 60 where the output of one photosensor is electronically subtracted from the output of the other photosensor. The resultant output signal from the differential amplifier 60 is representative of the difference in reflectance of the pulp slurry sample at the two wavebands.

In the preferred embodiment of FIGS. 1 and 2 the filter 56 is a bandpass filter for a light having wavelengths centered around 580 nanometers. The filter 58 is a bandpass filter for light having wavelengths centered around 420 nanometers. It is one aspect of this invention that these two wavebands give particularly accurate results when measuring the cooking degree of a pulp sample by light reflectance according to the method and apparatus herein described.

These results were obtained experimentally as described in Example 4 at the end of this description. In other embodiments bandpass filters of slightly different characteristics may be utilized depending on the pulp.

In some embodiments a light standardization circuit 63 is added to compensate for variations in the intensity of the light source 52. Between the light source 52 and the window 48 is a piece of transparent material 61 through which the light beam passes. The material 61 is in the form of a flat plate and is mounted in a frame (not shown) which orients it so that a portion of the light beam from the light source 52 is reflected away from the direction of the window 48 to impinge on a third photosensor 62. The electrical output from the photosensor 62 is also fed to the differential amplifier 60. A light intensity compensation photocell and reflector arrangement may also be similarly arranged with respect to the light source 50.

While a particular structure for the optical measuring device has been described it is within the spirit and scope of the invention to employ other similar devices for optically measuring the difference in reflectance of a chlorinated sample of pulp slurry at two predetermined wavebands.

Figure 3:
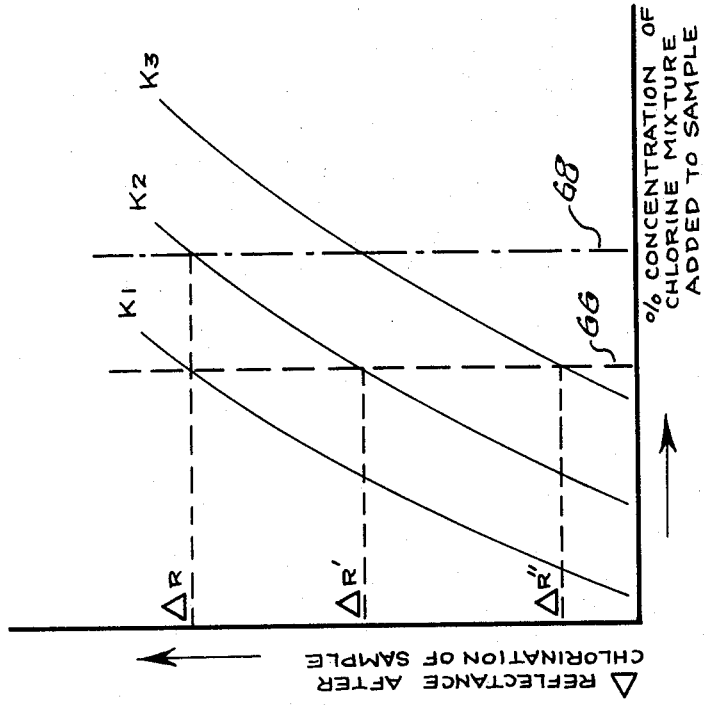
FIG. 3 is a graphical illustration of the relation of the percent chlorine concentration added to a sample of pulp slurry, which has thereafter undergone an accelerated chlorination reaction at an elevated temperature, to the Kappa No. and to the difference in reflectance of the chlorinated sample at the two predetermined wavebands.

Referring now more particularly to FIG. 3 the relationship between the Delta R or difference in reflectance at the two predetermined wavebands and the percent concentration of chlorine added to the pulp slurry sample when it undergoes the accelerated chlorination reaction is illustrated. For any given type of wood being pulped, it can be empirically determined that certain percentage of chlorine concentration added to a sample of the pulp slurry which thereafter undergoes an accelerated chlorination reaction at a predetermined temperature for a predetermined length of time will produce a Delta R indicative of its Kappa No., Chlorine No. of Permanganate No. which are measurements of the cooking degree of the pulp slurry and are defined by TAPI Standard T–236m–60, CPA Tech. Sect. Standard G–18; TAPPI Standard T–202os–69, CPPA Tech. Sect. Standard G–16; TAPPI Standard T–214m–50, CPA Tech Sect. Standard G–17, respectively.

As illustrated in FIG. 3, if a given predetermined percentage of chlorine on pulp denoted 66 is added by the chlorine injector 26 to the pulp sample, the sample is heated to a predetermined temperature (60 to 80° C.) and the reaction is allowed to continue for a relatively short period of time (on the order of 8 minutes to as little as 1 minute), the Delta R ($\Delta R$) observed by the optical measuring device 30 will indicate that the pulp sample has a particular Kappa No., $K_1$. For purposes of the example, the Kappa No. for the $\Delta R'$ is denoted as $K_2$ and the Kappa No. for the $\Delta R''$ is denoted as $K_3$. Also for the purposes of the illustration the discrete pulps of Kappa Nos. $K_1$, $K_2$ and $K_3$ have been shown as relatively straight, spaced apart, inclined lines; however, it should be understood that there are theoretically an infinite number of Kappa No. lines between those illustrated.

A variety of curves for use as standards similar to those shown in FIG. 3 may be obtained empirically with the optical apparatus heretofore described for various types of hard or soft wood pulps. The relationship illustrated by the curves may be easily adapted for inclusion in a computer program for use in the controller 34. For a given type of pulp the computer program within the controller 34 would automatically compute the Kappa No. of the pulp on the basis of the optical information signal from the measuring device 30, indicative of the Delta R, and from information representative of the constant value of the percentage concentration of chlorine added to the sample.

After determining the Kappa No. of the pulp sample the controller senses the temperature and pressure of the pulp slurry within the digester, and the flow rate of the cooking liquor by means of sensors 36, 38 and 40, respectively. The controller is also programmed to take into account the flow rate of the pulp through the digester. The controller 34 thereafter makes appropriate changes in the operating variables of the digester to produce a pulp having the desired cooking degree.

One such change is raising or lowering the temperature by varying the amount of steam to the heat exchangers through the valve servo 42. Another change is to increase or decrease the amount of cooking chemicals through the valve servo 44. Still another possible response of the controller 34 is to change the retention time of the pulp chips within the digester by varying the chip flow rate with servo 46 and the discharge rate with servo 47. The controller may make an appropriate change of any one of these factors or a combination of any number of them. The steady state effect of these changes is to maintain a substantially constant cooking degree after an initial start up period. As the cooking degree becomes constant so also does the control signal generated by the optical sensor 30 become substantially constant.

Figure 4:
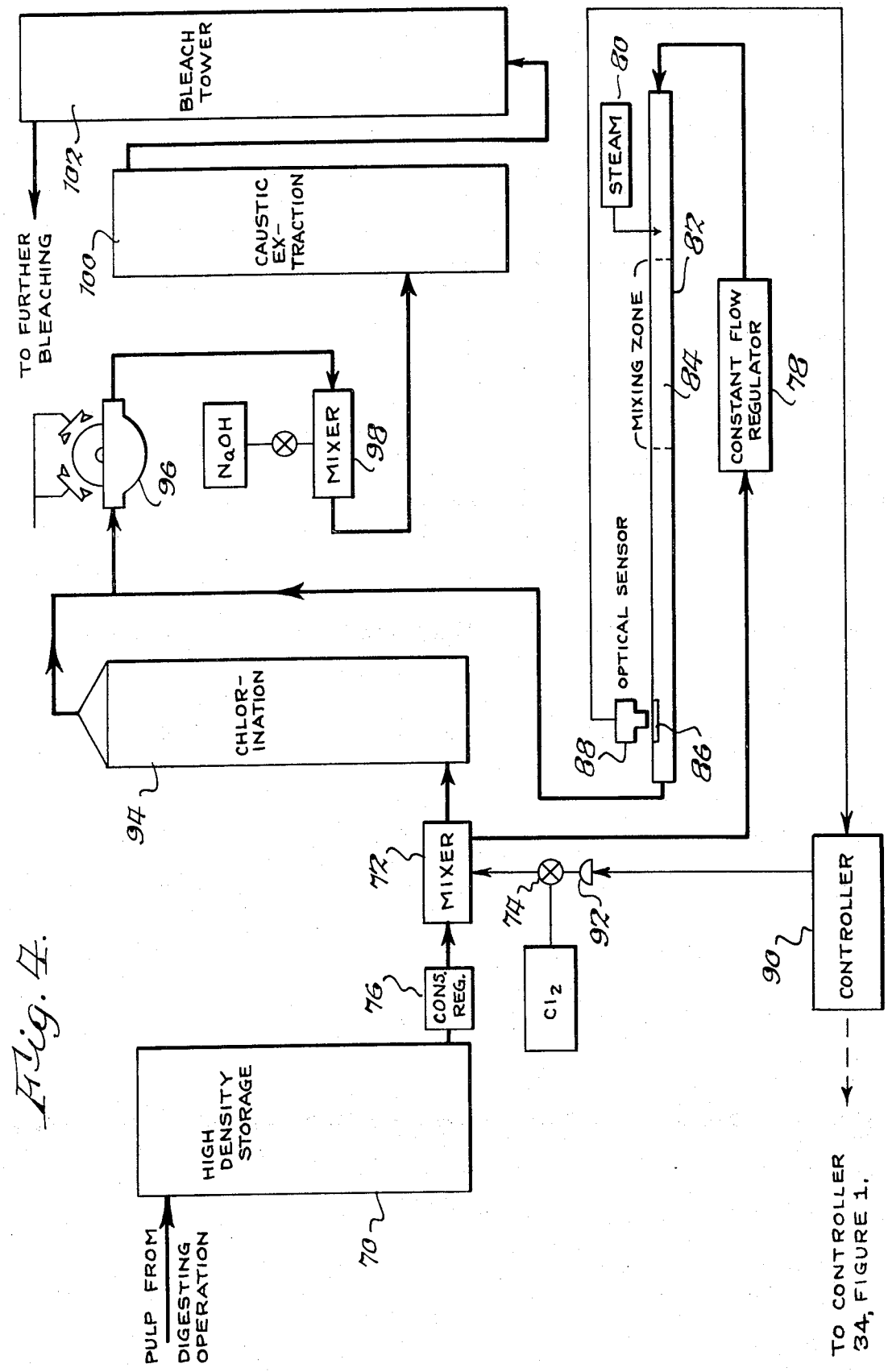
FIG. 4 is a schematic illustration of another embodiment of the invention as applied to the chlorination stage of a pulping process.

Referring now to FIG. 4 another embodiment of the present invention is shown. The pulp slurry after leaving the digester 14 is screened, washed, and then fed to a high density storage tank 70. The purpose of the high density storage tank is to allow for the continued operation of the chlorination, caustic extraction, and bleaching stages in the event that the digesting stage is shut down. The pulp slurry may be held in the high density storage tank for as long as four hours before it passes on to a chlorine mixer 72. Before entering the chlorine mixer, the sample is passed through a consistency regulator 76 to ensure that a predetermined weight of pulp solid is immersed in a given volume of slurry.

Chlorine is added to the mixer through a valve 74. A sample of the pulp slurry is extracted from the mixer 72 after the chlorine has been added. The flow rate of the pulp sample is held constant by a flow regulator 78. Steam 80 is injected into the sample stream to raise it to a predetermined temperature as high as 80° C. In other embodiments the pulp sample stream may be heated by other means, such as by a radar oven.

After the pulp sample stream has traveled along the length of a conduit 82 and through a mixing zone 84, it passes a window 86 in the conduit. An optical sensor 88, substantially identical to the optical measuring device 30, is positioned adjacent the window 86 and measures the reflectance of the pulp slurry sample at the two predetermined wavebands. The electrical output signal from the optical sensor 88, representative of the difference in reflectance at the two wavebands is fed to the input of a controller 90.

The output signal of the controller 90 is representative of changes in the optical sensor output signal. The controller output is fed to a valve operator 92 to admit more or less chlorine to the chlorination stage mixer 72, thus closing the loop.

Referring now to FIG. 3, if a predetermined $\Delta R$ is desired to control the chlorine applied for chlorination, regardless of fluctuations in cooking degree entering the bleachery, a pulp of unbleached Kappa No. $K_1$ will be adequately chlorinated by the percent chlorine on pulp at 66; however, if there is a change in entering Kappa No. to $K_2$ the reflectance reading will fall to $\Delta R'$ and it will be necessary to open valve 92 to admit the percent chlorine on pulp at 68 in order to re-establish control of the chlorination level. The sample pulp slurry is discharged into a chlorination washer 96 along with the main pulp stream which has passed through the chlorination tank 94. After leaving the washer, the pulp stream passes through a caustic mixer, 98, a caustic extractor 100, a bleach tower 102 and further bleaching stages.

In the embodiment shown in FIG. 4 the control of chlorination proceeds continuously and automatically in response to the optical information sensed by the measuring device 88. In another embodiment, however, a delayed output signal from the controller 34 of the embodiment of FIG. 1 is fed to the controller 90 of the embodiment shown in FIG. 4. Because the cooking degree determined by the controller 34 for the pulp slurry leaving the digester 14 is indicative of the degree of chlorination that will be required in the succeeding chlorination stages, the controller 34 may be programmed to directly control additions of chlorine at the chlorination stage. The computer program of necessity must take into account that the pulp slurry for which the cooking degree has been determined may be delayed in the high density storage tank 70 for a period of as long as four hours. The output signal to the controller 90 (shown for purposes of illustration in dotted line fashion) must compensate for this by having an appropriate time delay.

The output signal to the controller 90 causes it to adjust the valve 74 to admit more or less chlorine to the mixer 72. For example, referring again to FIG. 3, if the controller 34 determines by means of the optical measuring device 30 that the pulp slurry leaving the digester 14 has a Kappa No. $K_2$, a reflectance difference equal to Delta R', and it is desired that the pulp slurry have a reflectance difference equal to Delta R, the controller 34 will feed a signal (delayed by an appropriate time period) to the controller 90 which will open the valve 74 and allow an increased concentration of chlorine to be mixed with the pulp slurry. The concentration will then be that designated as 68 in FIG. 3.

It is to be understood that the technical nature of the controllers 34 and 90 are not features of this invention. Thus the controllers in some embodiments are programmed, analog computers. In other embodiments they are programmed, digital computers. In still other embodiments the controller 34 is a programmed computer while controller 90 is a less sophisticated electronic, automatic control circuit. In all embodiments the controllers serve as means for controlling selected pulp processing operation variables in response to a control signal representative of the difference in reflectance at two predetermined wavebands of a pulp sample which has undergone an accelerated chlorination reaction at a predetermined, elevated temperature for a predetermined period of time.

In embodiments wherein either or both of the controllers are digital computers, it is to be understood that the controller circuits include appropriate analog to digital signal converter circuits to receive the outputs from the various sensors. Such circuits are well known in the art and therefore will not be described in detail.

The invention is also not limited to applications involving a continuous digester. In some pulp processes the pulp is fed into a digester as a batch and the digester is thereafter sealed. Either continuous or discrete samples may be extracted from the batch digester and processed in a manner substantially the same as that described in reference to FIGS. 1, 2 and 3. Again the optical measuring device 30 determines the Delta reflectance at the two predetermined wavebands after the pulp sample has undergone an accelerated chlorination reaction.

The optical information in the form of an electrical signal is fed to the controller 34 which makes appropriate adjustments to the various factors described above in reference to FIG. 1 to control the batch digester. In the alternative, the controller 34 might allow the digesting process to continue until a certain cooking degree has been obtained, as detected by the optical measuring device, and would then open the batch digester and allow the digested pulp to pass onto the further processing stages.

Where this description has referred to chlorine, hypochlorites, chlorine monoxide, chlorine dioxide or mixtures of chlorine and chlorine dioxide may also be used.

The invention and its practice are further illustrated by the following examples.

Example 1

A series of western Canadian unbleached kraft softwood pulps were treated with 5.28% $Cl_2$ on pulp for one minute at 80° C. The unwashed pulps were transferred to a glass cell and reflectance measurements were made on a General Electric Recording Spectrophotometer (GERS). The reflectance measurements from 400 to 700 nm., in increments of 20 nm., were fed to a computer where all combinations of differences $(R_2-R_1)$, ratios of $R_2/R_1$ and sums $(R_2+R_1)$ of the values obtained were calculated and correlated with the Kappa No., Permanganate No. and Chlorine No. of the pulps. The experimental results for the optimum combinations of wavelengths are tabulated below:

TABLE I

| Kappa No. | Permanganate No.[1] | Chlorine No. | Difference ($\Delta R$) (600−420) | Ratio $R(600)/R(420)$ | Sum ($\Sigma R$) (600+500) |
|---|---|---|---|---|---|
| 21.6 | 17.0 | 3.77 | 14.2 | 3.18 | 31.6 |
| 23.4 | 18.6 | 4.12 | 11.0 | 2.92 | 25.5 |
| 24.7 | 20.1 | 4.39 | 10.3 | 2.77 | 24.7 |
| 26.4 | 20.2 | 4.66 | 9.1 | 2.68 | 22.0 |
| 27.3 | | 4.67 | 9.8 | 2.72 | 23.7 |
| 29.1 | 21.6 | 5.15 | 7.6 | 2.52 | 19.5 |
| 31.0 | 23.0 | 5.42 | 5.6 | 2.08 | 17.0 |

[1] 50 ml. sample of $KMnO_4$.

The following values of $R^2$ were obtained:

$\Delta R$ vs. Kappa No. —————————————— $R^2=0.93$
$\Delta R$ vs. Permanganate No. ————————— $R^2=0.97$
$\Delta R$ vs. Chlorine No. —————————————— $R^2=0.96$
$R_2/R_1$ vs. Kappa No. —————————————— $R^2=0.92$
$R_2/R_1$ vs. Permanganate No. ——————— $R^2=0.96$
$R_2/R_1$ vs. Chlorine No. ————————————— $R^2=0.93$
$\Sigma R$ vs. Kappa No. ————————————————— $R^2=0.91$
$\Sigma R$ vs. Permanganate No. ————————— $R^2=0.95$
$\Sigma R$ vs. Chlorine No. ——————————————— $R^2=0.94$
Chlorine No. vs. Kappa No. —————————— $R^2=0.99$
Chlorine No. vs. Permanganate No. ——— $R^2=0.96$
Kappa No. vs. Permanganate No. ————— $R^2=0.98$ This shows that measurement of $\Delta R$ (600−420) is at least as reliable a method of measuring cooking degree as any of the accepted methods such as Chlorine No., Kappa No. or Permanganate No. that are now used in the industry.

These results also show that ratios of $R_{600}/R_{420}$ and $\Sigma R$ (600+500) gave a useable response to changes in cooking degree for this type of wood and cooking process.

To determine which functions of the reflectance signals at the predetermined wavebands gave the widest variation for discrete changes in the Kappa No. being observed, the following ratios of the signals for Kappa No. 21.6 over Kappa No. 31.0 were calculated from Table I:

(1) $R(600)/R(420)$: $3.18/2.08=1.53$
(2) $\Sigma R$ (600+500): $31.6/17.0=1.83$
(3) $\Delta R$ (600−420): $14.2/5.6=2.54$ Since all calculations were made from the same basic data obtained from the same samples it is clear that $\Delta R$ provides the largest signal variation and thus the best function for control purposes. Other experimental work, with hardwood, gave similar results for $\Delta R$ vs. Kappa No. but did not provide a significant relationship between Kappa No. and either ratios or sums of reflectance readings.

Example 2

Three unbleached eastern softwood pulps covering the range 17 to 32 Kappa No. were each chlorinated at four levels of chlorine addition such that the chlorine applied, as percent available chlorine on pulp, was 0.85, 1.00, 1.15 and 1.30 times the Chlorine No. of the pulp. In these experiments the chlorine applied included an amount of chlorine dioxide equivalent to 0.25% available chlorine on pulp. The chlorinations were carried out at 3% consistency for 1 hour at 25° C. The unwashed chlorinated stock was placed in a glass cell and the reflectances were measured between 400 and 700 nm. on a GERS. Data at 20 nm. increments were fed to a computer to determine the maximum spread in $\Delta R$ over the range 0.85 to 1.30 times the Chlorine No. for each unbleached pulp sample. The data presented below were used to prepare standardized curves for cooking control of the type illustrated in FIG. 3.

TABLE II

| | Kappa No. | | | | | |
|---|---|---|---|---|---|---|
| | 17.2 | | 23.6 | | 31.9 | |
| Chlorine No. | 2.71 | | 4.21 | | 5.46 | |
| Chlorination level chlorine No. times | Chlorine applied, percent on pulp | $\Delta R$ (580−420) | Chlorine applied, percent on pulp | $\Delta R$ (580−420) | Chlorine applied, percent on pulp | $\Delta R$ (580−420) |
| 0.85 | 2.30 | 8.9 | 3.58 | 8.9 | 4.64 | 6.0 |
| 1.00 | 2.71 | 13.4 | 4.21 | 14.5 | 5.46 | 13.0 |
| 1.15 | 3.11 | 17.1 | 4.84 | 18.8 | 6.28 | 17.5 |
| 1.30 | 3.52 | 20.4 | 5.47 | 21.2 | 7.10 | 19.6 |

It has been demonstrated in the art that chlorination levels of between 1.15 and 1.30 times the Chlorine No. are optimum for bleaching of softwood kraft pulp. From the above table it can be seen that controlling chlorination to a $\Delta R$ of 19.0 as described above in reference to the embodiments of FIGS. 1 and 4 will result in all of the pulps being chlorinated in this optimum range.

Example 3

Two unbleached eastern hardwood sulfite pulps covering the Kappa No. range 11.1 to 15.1 were each chlorinated at four levels of chlorine addition such that the chlorine applied, as percent available chlorine on pulp, was 0.6, 0.8, 1.0 and 1.2 times the Chlorine No. of the pulp. These chlorinations were carried out at 3% consistency for 45 minutes at 25° C. and were repeated at 3% consistency for 1 minute at 80° C. Results of $\Delta R$ optimized with respect to the wavelengths of the two readings are tabulated below.

TABLE III

| Chlorination level, chlorine No. times | Temp., °C | Kappa No. 11.1 / Chlorine No. 2.12 | | Kappa No. 15.1 / Chlorine No. 2.89 | |
|---|---|---|---|---|---|
| | | Chlorine applied, percent on pulp | ΔR (580—420) | Chlorine applied, percent on pulp | ΔR (580—420) |
| 0.6 | 25 | 1.27 | 11.4 | 1.73 | 11.3 |
| 0.8 | 25 | 1.70 | 14.3 | 2.31 | 14.6 |
| 1.0 | 25 | 2.12 | 17.5 | 2.89 | 18.3 |
| 1.2 | 25 | 2.55 | 19.9 | 3.47 | 19.6 |
| 0.6 | 80 | 1.27 | 11.2 | 1.73 | 11.0 |
| 0.8 | 80 | 1.70 | 13.1 | 2.31 | 14.0 |
| 1.0 | 80 | 2.12 | 15.5 | 2.89 | 16.3 |
| 1.2 | 80 | 2.55 | 17.9 | 3.47 | 17.7 |

It is known that chlorination levels of 0.95 to 1.0 times the Chlorine No. are optimum for bleaching of sulfite pulps. From the above table it can be seen that to achieve this result at 25° C. the chlorination should be controlled such that a ΔR of about 17 is obtained whereas to accomplish the same purpose at 80° C. the chlorination should be controlled such that a ΔR of about 15.5 is obtained. From these results it is clear that although temperature may affect the level of the ΔR for a given chlorine application a workable relationship exists at elevated temperatures. Thus a control signal representative of the ΔR of a sample which has undergone an accelerated chlorination reaction at a predetermined elevated temperature (80° C.) for a relatively short period of time (1 minute) may be used to optimize the control of chlorination in the manner described above in reference to the embodiments of FIGS. 1 and 4.

Example 4

A series of unbleached eastern Canadian hardwood kraft pulps covering a range of Kappa No. 14 to 24 were chlorinated at 2% consistency for 1 hour at 25° C. using a standard application of 2.0% $Cl_2$ on pulp. The unwashed chlorinated pulps were transferred to a glass cell and reflectance measurements were made across the visible spectrum using the GERS. The difference in reflectance $R_2-R_1(\Delta R)$ was calculated for all combinations where $R_1$ equals the reflectances at 400, 420, 440, 460, 480 and 500 nm. and $R_2$ equals the reflectances at 540, 560, 580, 600, 620, 640, 660, 680 and 700 nm. The ΔR obtained for each combination of $R_2-R_1$ on the 24 Kappa pulp was then subtracted from the ΔR obtained for the corresponding wavelengths on the Kappa No. 14 pulp. This difference represented the spread of ΔR over the range of cooking degree. These results are illustrated in FIG. 5.

For control purposes it is desirable that the spread of ΔR should be as wide as possible in order to obtain maximum usable signal strength for control. As is clearly shown in FIG. 5, for a given $R_1$ value there is a maximum for $R_2$ at 58 nm. The family of curves shows that when $R_2=580$ nm., the maximum spread of ΔR with Kappa No. is at 400 nm. in the visible spectrum. Although lower wavelengths in the UV range may also give suitable signals for $R_1$, practical limitations on light source, materials of construction of the window etc. indicate that a band pass centered around 420 nm. is the practical optimum for measurement of $R_1$. FIG. 6 illustrates the substantially linear correlation between known Kappa No. and the ΔR (580—420) observed for the above described pulps after chlorination at 2% consistency for 1 hour at room temperature using a standard application of 2.0% $Cl_2$ on pulp.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A system for controlling the cooking degree of pulp in a pulp digester comprising means for withdrawing a sample of pulp slurry from the digester, means for adding a predetermined concentration of chlorinating reagent to the pulp slurry sample, means for heating the chlorinated sample and maintaining it at a predetermined elevated temperature for a predetermined time such that a predetermined endpoint is reached in the chlorination reaction, a light source directed to shine on the chlorinated sample after the predetermined endpoint is reached, means for generating a signal representative of a predetermined composite function of the intensity of the light reflected at two predetermined wavebands by the unwashed chlorinated pulp sample, and means responsive to the signal for controlling the pulp digester.

2. The control system of claim 1 wherein the predetermined composite function of the intensity of the light reflected at two predetermined wavebands is the difference in intensities of light reflected from the unwashed chlorinated sample at a first waveband centered at approximately 580 nanometers and a second waveband centered at approximately 420 nanometers.

3. A control system as recited in claim 1 wherein the means for controlling the pulp digester comprises means for controlling the retention time of the pulp within the digester, means for controlling the temperature of the pulp slurry within the digester, and means for controlling the concentration of the cooking liquor within the digester.

4. Apparatus for controlling processing of pulp in a continuous pulp digester of the type having steam heat exchangers and a bath of cooking chemicals comprising first means for withdrawing a continuous sample of pulp slurry from the digester, second means for washing the sample, third means for regulating the consistency and rate of flow of the continuous pulp sample, fourth means for adding a chlorinated reagent at a predetermined rate to the regulated pulp sample such that a predetermined concentration of the chlorinating reagent exists per unit of volume of the pulp sample, fifth means for continuously heating each incoming portion of the regulated chlorinated pulp sample and maintaining it at a predetermined temperature for a predetermined period of time such that a predetermined endpoint in the chlorination reaction of the sample is reached, a light source directed to shine on the chlorinated sample after the predetermined endpoint is reached, sixth means for continuously optically sensing the chlorinated pulp sample after the predetermined endpoint is reached and for producing an input signal representative of the difference in the intensity of the light reflected at two predetermined wavebands by the chlorinated pulp sample, seventh means responsive to the input signal for controlling the operation of the continuous digester.

5. A system for controlling the chlorination of fibrous cellulosic material moving along a continuous flow path comprising first means for injecting a variable amount of a chlorinating agent into the material moving along the path, second means for extracting a small continuous sample of the material moving along the path after the addition of the chlorinating reagent, third means for continuously heating the chlorinated sample and maintaining it at a predetermined elevated temperature for a predetermined time to allow the chlorination reaction to reach a predetermined endpoint, a source of light directed to shine upon the chlorinated sample after the predetermined endpoint has been reached, optical sensing means for generating a control signal representative of a predetermined composite function of the intensity of light reflected at two predetermined wavebands by the chlorinated sample, and fourth means responsive to the control signal for regulating the amount of chlorinating reagent injected by the first means to maintain the control signal at a substantially constant predetermined value.

6. In a pulp processing system of the type having a continuous digester followed by a chlorination stage, a control system comprising means for withdrawing a sample of pulp slurry from the digester, means for adding a predetermined concentration of a chlorinating reagent to the pulp slurry sample, means for heating the chlorinated sample and maintaining it as a predetermined elevated temperature for a predetermined time such that a predetermined endpoint in the chlorination reaction of the sample is reached, a light source directed to shine light on the chlorinated sample after the predetermined endpoint has been reached, optical sensing means for generating an input signal representative of a predetermined composite function of the light reflected by the sample at two predetermined wavebands, means responsive to the input signal for generating a control signal, means responsive to the control signal for feedback control of the pulp digester so as to maintain the cooking degree of the pulp within the digester at a substantially constant predetermined value after an initial start up period, and means responsive to the control signal for feed forward control of the amount of chlorinating reagent in the chlorination stage.

7. A method of determining the cooking degree of fibrous cellulosic material passing through a digesting process comprising the steps of withdrawing a small sample of the fibrous material from the digesting process, adding a predetermined concentration of a chlorinating reagent to the sample, heating the chlorinated sample and maintaining it at a temperature between about 60° and 80° C. for about one to ten minutes until a predetermined endpoint in the chlorination reaction is reached, optically measuring a predetermined composite function of the intensity of light reflected by the unwashed chlorinated pulp sample at two predetermined wavebands after the predetermined endpoint has been reached, and comparing the value of the predetermined composite function obtained with that of the desired level of cooking degree.

8. A method of determining the cooking degree of fibrous cellulosic material in accordance with claim 7 wherein the predetermined composite function of the intensity of the light reflected at two predetermined wavebands is the difference in intensities of light reflected from the unwashed chlorinated sample.

9. A method of determining the degree of chlorination of fibrous cellulosic material passing through a chlorination process comprising the steps of withdrawing a small sample of the chlorinated pulp immediately after addition of the chlorinating reagent, heating the chlorinated sample and maintaining it at a temperature between about 60° and 80° C. for about one to ten minutes until a predetermined endpoint in the chlorination reaction is reached, optically measuring a predetermined composite function of the intensity of light reflected by the unwashed chlorinated pulp sample at two predetermined wavebands after the predetermined endpoint has been reached, and comparing the value of the predetermined composite function obtained with that of the desired level of chlorination.

10. A method of determining the degree of chlorination of fibrous cellulosic material in accordance with claim 9 wherein predetermined composite function of the intensity of the light reflected at two predetermined wavebands is the difference in intensities of light reflected from the unwashed chlorinated sample.

11. A method of determining the cooking degree of fibrous cellulosic material in accordance with claim 8 wherein, after comparing the values of the differences in reflectance, regulating the conditions of cooking.

12. A method of determining the degree of chlorination of fibrous cellulosic material passing through a chlorination process comprising the steps of withdrawing a small sample of the chlorinated pulp immediately after addition of the chlorinating reagent, heating the chlorinated sample and maintaining it at a temperature between about 60° and 80° C. for about one to ten minutes until a predetermined endpoint in the chlorination reaction is reached, optically measuring the difference in light reflectance of the unwashed chlorinated pulp sample at two predetermined wavebands after the predetermined end point has been reached, comparing the value of the difference in reflectance obtained with that of the desired level of chlorination, and regulating the addition of chlorinating reagent to the main body of aqueous slurry of the fibrous material.

13. A method of determining the degree of chlorination in accordance with claim 12, wherein the regulation of the addition of chlorinating reagent to the main body of aqueous slurry is automatically controlled.

14. A method of determining the cooking degree of fibrous cellulosic material in accordance with claim 11, wherein the regulation of the conditions of cooking of the main body of the material is automatically controlled.

15. A method of determining the degree of chlorination of fibrous cellulosic material according to claim 9, wherein the two predetermined wavebands are at about 580 nanometers and 420 nanometers.

16. A method of determining the degree of chlorination of fibrous cellulosic material according to claim 9, wherein the comparison of the difference in reflectance actuates a control which regulates the amount of chlorinating reagent to be added to the main body of the aqueous slurry of the fibrous material.

References Cited

UNITED STATES PATENTS

| | | | |
|---|---|---|---|
| 3,465,550 | 9/1969 | Strom et al. | 162—238 X |
| 3,486,971 | 12/1969 | Weyrick | 162—49 X |
| 3,607,623 | 9/1971 | Chappelle | 162—49 X |

OTHER REFERENCES

Obenshain: "Black Widow Bleaching Control System," TAPPI, vol. 41 No. 1 (January 1958), pp. 1–9.

ROBERT L. LINDSAY, JR. Primary Examiner

A. D'ANDREA, JR., Assistant Examiner

U.S. Cl. X.R.
162—238; 356—212